United States Patent [19]

Welsh

[11] 4,411,878

[45] Oct. 25, 1983

[54] PREPARATION OF MN$_3$O$_4$

[75] Inventor: Jay Y. Welsh, Catonsville, Md.

[73] Assignee: Chemetals Incorporated, Glen Burnie, Md.

[21] Appl. No.: 430,525

[22] Filed: Sep. 30, 1982

[51] Int. Cl.$^3$ .............................................. C01G 45/02
[52] U.S. Cl. ................................................... 423/605
[58] Field of Search ........................................ 423/605

[56] References Cited

U.S. PATENT DOCUMENTS

| 1,937,488 | 11/1933 | Jenness | 423/605 |
|---|---|---|---|
| 2,103,219 | 12/1937 | Jenness | 423/605 |
| 2,103,221 | 12/1937 | Jenness | 423/605 |
| 3,361,531 | 1/1968 | Erb et al. | 423/605 |
| 3,715,764 | 2/1973 | Chu | 423/605 |
| 3,767,780 | 10/1973 | Bellas | 423/605 |
| 3,950,505 | 4/1976 | Sochol | 423/605 |
| 4,010,236 | 3/1977 | Welsh | 423/605 |

OTHER PUBLICATIONS

Cismam et al., "Chemical Absts.", vol. 59, 1963, p. 2205(g).

Primary Examiner—Herbert T. Carter
Attorney, Agent, or Firm—Lyon & Lyon

[57] ABSTRACT

A process of preparing Mn$_3$O$_4$, by the reduction of higher manganese oxides, using methane as a reducing gas under controlled temperatures.

9 Claims, 1 Drawing Figure

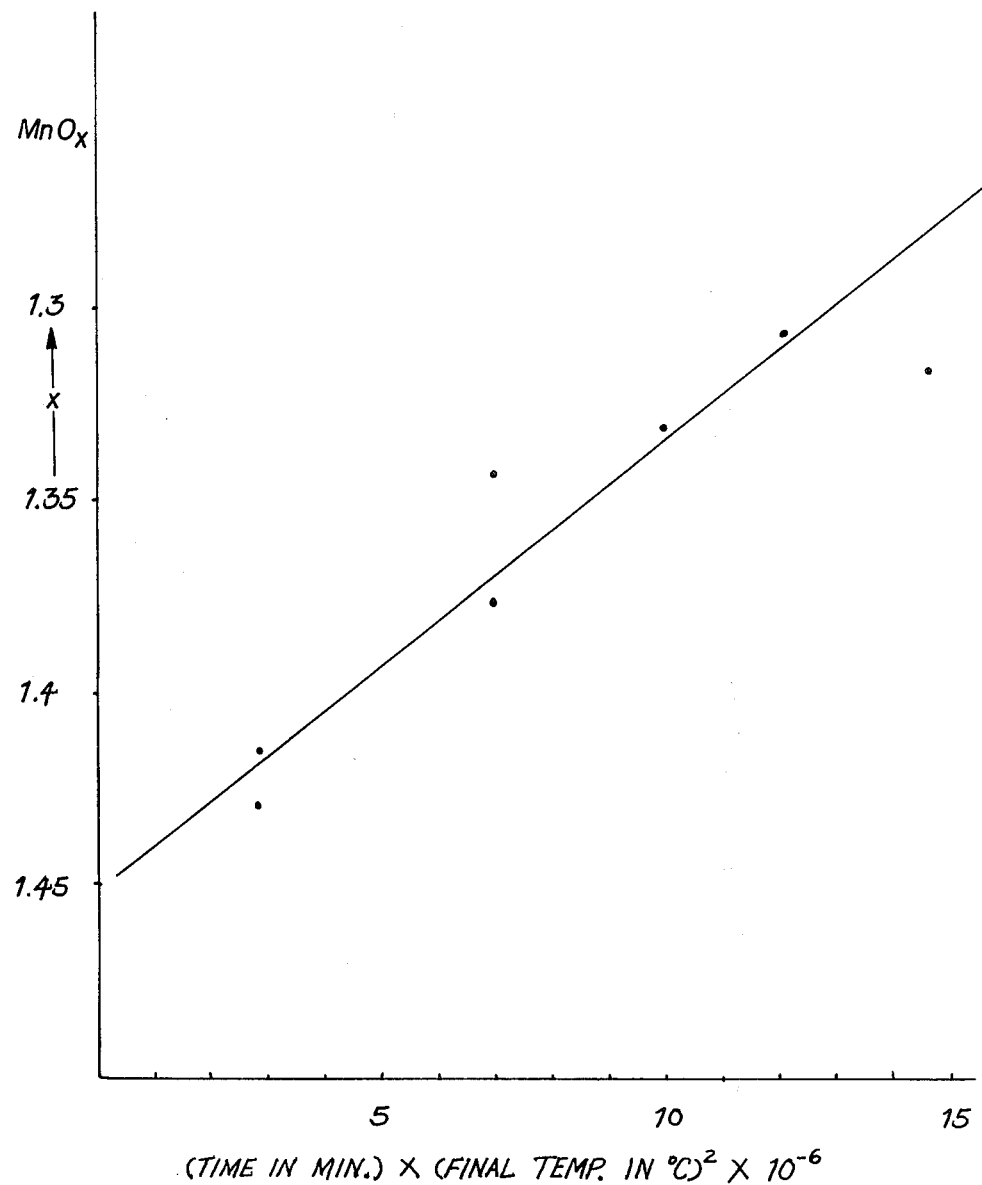

PREPARATION OF MN3O4

FIELD OF THE INVENTION

The invention relates to an improved process for preparing Mn3O4 by the controlled reduction of higher manganese oxides.

BACKGROUND OF THE INVENTION

Mn3O4 has been produced by sintering manganese (II) oxide in the presence of oxygen. Manganese (II) oxide may be produced by heating manganese (II) carbonate, or by heating manganese dioxide.

These prior methods for the preparation of Mn3O4 require high temperatures to sinter the manganese (II) oxide. In addition, it is obviously inefficient to reduce manganese dioxide to manganese (II) oxide, and then re-oxidize manganese (II) oxide to produce Mn3O4.

SUMMARY OF THE INVENTION

The present invention provides an improved process for the preparation of Mn3O4, by the reduction of higher manganese oxides. Unlike prior processes, which were generally conducted at red heat, the present process is characterized by a relatively low temperature in the range from about 250° to about 550° C., depending on the starting material. The starting material is a higher manganese oxide, such as manganite, MnOOH. It has been found that the reduction of a higher manganese oxide may be controlled to recover Mn3O4.

The reduction of a higher manganese oxide, such as manganite, occurs in two steps: a relatively fast step producing Mn3O4, followed by a slower second step producing manganese (II) oxide.

The Mn3O4 produced by the present invention is useful as a source of manganese for the production of ferrites.

It is a feature of the present invention that the two-step reduction of a higher manganese oxide may be stopped after the first step, to recover Mn3O4.

It is an advantage of the present invention that it permits a relatively low temperature reduction of a higher manganese oxide.

It is another advantage of the present invention that it is a dry process, much simpler to carry out than alternate wet processes involving the precipitation of manganese (II) hydroxide.

Still other advantages of the invention will be readily apparent to those of ordinary skill in the art from the detailed description of the invention which follows.

DETAILED DESCRIPTION OF THE INVENTION

The process for the preparation Mn3O4 by the reduction of higher manganese oxides is surprising, since thermodynamic calculations suggest that it is not possible to effect a step-wise reduction of higher manganese oxides, such as MnO2, Mn2O3, MnOOH, or other intermediate manganese oxides having an oxygen ratio above MnO1.33 to Mn3O4. Mn3O4 has a manganese to oxygen ratio of MnO1.33. Surprisingly, it has been found that using methane as a reducing gas permits a practical step-wise reduction of higher manganese oxides to Mn3O4. Other reducing gases such as carbon monoxide or hydrogen do not allow the two-step reduction process to be stopped after the first step, to recover Mn3O4.

The process for the preparation of Mn3O4 by the reduction of Mn2O3 or MnO2 may be described by the equations:

Similar equations apply to the reduction of MnOOH and other higher manganese oxides in the presence of methane gas to produce Mn3O4. As used herein the term higher manganese oxides refers to manganese oxides having an oxygen ratio above MnO1.33.

In accordance with the present invention, the higher manganese oxide to be reduced is heated, in a kiln, in the presence of an excess current of methane gas. The temperature to which the higher manganese oxide should be heated ranges from about 250° C. to about 550° C., depending upon the specific higher manganese oxide to be reduced. For example, it has been found that manganese dioxide, MnO2, should be heated to a temperature from about 250° to about 400° C. In case Mn2O3 or M$_n$OOH is to be reduced to Mn3O4, it is found that temperatures from about 300° C. to 500° C. should be used. In general, higher temperatures produce larger product particles and/or increased crystallinity. However, it has been found that at temperatures above about 550° C., it is not practical to stop the two-step reduction, to recover Mn3O4. Preferably the reduction of a higher manganese oxide in the presence of an excess of methane gas is conducted at temperatures below about 500° C. to facilitate stopping the two-step reduction after the first step, to recover Mn3O4.

As described above, prior processes required the reoxidation of manganese (II) to produce MN3O4. These prior processes reuired much higher temperatures, up to about 700° C., and therefore resulted in a loss of surface area and activity of the Mn3O4 product because of sintering. The process of the present invention is a significant improvement over the prior process because it permits the reduction of higher oxides of manganese to Mn3O4 at relatively low temperatures, well below sintering temperatures.

EXAMPLE

The reduction of manganite, MnOOH to Mn3O4 was conducted in the presence of a flowing current of excess methane gas, at temperatures ranging from 310° C. to 550° C. The manganese to oxygen ratio of the product produced in each case is set forth below, and illustrated in the accompanying graph.

| Reduction of MnOOH to Mn3O4 | | |
|---|---|---|
| Final Temperature | Total Time | Product |
| 450 | 35 min. | MnO1.38 |
| 430 | 15 min. | MnO1.43 |
| 480 | 31 min. | MnO1.347 |
| 510 | 38 min. | MnO1.334 |
| 550 | 39 min. | MnO1.312 |
| 495 | 59 min. | MnO1.319 |
| 310 | 31 min. | MnO1.42 |

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A process of perparing $Mn_3O_4$ from a higher manganese oxide, comprising the steps of:

immersing a higher manganese oxide in a flow of a reducing gas containing methane, heating said higher manganese oxide in said flowing reducing gas containing methane to a temperature from about 250° C. to about 550° C., and recovering $Mn_3O_4$.

2. The process of preparing $Mn_3O_4$ set forth in claim 1, wherein said reducing gas consists essentially of methane.

3. The process of preparing $Mn_3O_4$ set forth in claim 1 or 2, wherein said higher manganese oxide is heated to a temperature from about 250° C. to about 500° C.

4. The process of preparing $Mn_3O_4$ set forth in claim 1 or 2, wherein said higher manganese oxide is $MnO_2$.

5. The process of preparing $Mn_3O_4$ set forth in claim 4 wherein said $MnO_2$ is heated to a temperature from about 250° C. to about 400° C.

6. The process of preparing $Mn_3O_4$ set forth in claim 1 or 2, wherein said higher manganese oxide is $Mn_2O_3$.

7. The process of preparing $Mn_3O_4$ set forth in claim 6, wherein said $Mn_2O_3$ is heated to a temperature from about 300° C. to about 500° C.

8. The process of preparing $Mn_3O_4$ set forth in claim 1 or 2, wherein said higher manganese oxide is MnOOH.

9. The process of preparing $Mn_3O_4$ set forth in claim 8, wherein said MnOOH is heated to a temperature from about 300° C. to about 500° C.

* * * * *